US006282560B1

(12) United States Patent
Eilert et al.

(10) Patent No.: US 6,282,560 B1
(45) Date of Patent: *Aug. 28, 2001

(54) MANAGING PROCESSOR RESOURCES IN A NON-DEDICATED COMPUTER SYSTEM

(75) Inventors: Catherine Krueger Eilert; Peter Bergersen Yocom, both of Wappingers Falls, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 8 days.

(21) Appl. No.: 08/829,538

(22) Filed: Mar. 28, 1997

(51) Int. Cl.$^7$ ........................................ G06F 9/00
(52) U.S. Cl. .................................... 709/100; 709/102
(58) Field of Search .................... 709/100, 102, 709/104, 107, 103

(56) References Cited

U.S. PATENT DOCUMENTS

| | | | |
|---|---|---|---|
| 5,191,410 | 3/1993 | McCalley et al. | 358/86 |
| 5,204,947 | 4/1993 | Bernstein et al. | 395/157 |
| 5,210,872 | * 5/1993 | Ferguson et al. | 709/102 |
| 5,333,266 | 7/1994 | Boaz et al. | 395/200 |
| 5,392,429 | * 2/1995 | Agrawal et al. | 708/446 |
| 5,394,548 | * 2/1995 | Nakajima et al. | 709/103 |
| 5,408,465 | 4/1995 | Gusella et al. | 370/17 |
| 5,461,611 | * 10/1995 | Drake, Jr. et al. | 370/420 |
| 5,473,680 | 12/1995 | Porter | 379/201 |
| 5,473,773 | * 12/1995 | Aman et al. | 709/104 |
| 5,487,167 | * 1/1996 | Dinallo et al. | 395/807 |
| 5,491,694 | 2/1996 | Oliver et al. | 370/85.4 |
| 5,493,568 | 2/1996 | Sampat et al. | 370/60 |
| 5,497,373 | 3/1996 | Hulen et al. | 370/79 |
| 5,628,013 | * 5/1997 | Anderson et al. | 709/107 |
| 5,721,922 | * 2/1998 | Dingwall | 709/103 |
| 5,745,758 | * 4/1998 | Shaw et al. | 709/102 |
| 5,748,468 | * 5/1998 | Notenboom | 364/132 |
| 5,761,692 | * 6/1998 | Ozden et al. | 711/4 |
| 5,838,968 | * 11/1998 | Culbert | 709/104 |

FOREIGN PATENT DOCUMENTS

| | | | |
|---|---|---|---|
| 07023104 | 1/1995 | (JP) | H04M/3/00 |
| 07307735 | 11/1995 | (JP) | H04L/12/28 |
| 08022435 | 1/1996 | (JP) | G06F/15/00 |
| 08147178A | 7/1996 | (JP) | G06F/9/46 |

OTHER PUBLICATIONS

"Basic Software for Multimedia Information Systems," FUJITSU. 46, 3, pp. 342–350 (05, 1995).
"An Approach For Continuous Media Object In The Keio–MMP Project," Keizo Fujii, Hideyuki Tokuda, Nobuo Saito, The Institute Of Electronics, Information and Communication Engineers, Technical Report of IEICE, CPSY69–112 (1997–03).
"Distributed Multimedia Services," IBM Technical Disclosure Bulletin, vol. 37, No. 08, pp. 63–64 (Aug. 1994).
"File Input/Output Control for Mixed Multimedia and Non–Multimedia Services," IBM Technical Bulletin, vol. 38, No. 11, p. 363 (Nov. 1995).

* cited by examiner

Primary Examiner—Majid Banankhah
(74) Attorney, Agent, or Firm—Lawrence D. Cutter, Esq.; William A. Kinnaman, Jr., Esq; Heslin & Rothenberg, P.C.

(57) ABSTRACT

Managing processor resources in a non-dedicated computer system. An amount of a processor resource is allocated to a real-time application of the computer system. The amount does not exceed a limit chosen for a group of real-time applications, wherein the group includes the real-time application being allocated the resource. A selected amount of the processor resource remains available to execute other types of applications and work on the system. During processing of the real-time application, use of the processor resource does not exceed a chosen maximum value, thereby ensuring the processor resource is not monopolized by the real-time application and allowing other types of work to be processed on the system.

32 Claims, 8 Drawing Sheets fig. 1 fig. 2 fig. 3 fig. 4 fig. 5 fig. 6 fig. 7 fig. 8 fig. 9 fig. 10 fig. 11

MANAGING PROCESSOR RESOURCES IN A NON-DEDICATED COMPUTER SYSTEM

CROSS REFERENCE TO RELATED APPLICATIONS

This application contains subject matter which is related to the subject matter of the following applications, each of which is assigned to the same assignee as this application and filed on the same day as this application. Each of the below listed applications is hereby incorporated herein by reference in its entirety:

"System of Managing Processor Resources In A Non-Dedicated Computer System," by Eilert et al., Ser No. 08/827,286;

"Managing Processor Resources In A Multisystem Environment," by Eilert et al., Ser. No. 08/827,529; and "System of Managing Processor Resources In A Multi-system Environment," by Eilert et al., Ser. No. 08/829,538.

TECHNICAL FIELD

This invention relates, in general, to managing processor resources of a computer system and, in particular, to providing appropriate processor resources to present smooth, uninterrupted real-time data streams, while enabling other types of applications and work to concurrently execute on the same system.

BACKGROUND ART

Delivery of quality real-time data streams has been and continues to be an important concern in the computer environment. Real-time data streams include, for instance, video, audio and multimedia data streams, to name a few. Currently, two approaches are used to deliver real-time data streams: configuration control and high dispatch priority, each of which is described below.

In the configuration control approach, a server is dedicated to the delivery of real-time data streams. In particular, the server is configured with sufficient capacity to deliver real-time data streams at a given rate. Since the server is dedicated to the delivery of real-time data streams, the real-time streams monopolize the system resources leaving very little, if anything at all, for other types of work.

In the high dispatch priority approach, the real-time applications are run at a very high dispatch priority. This technique need not be run on a dedicated system; however, by running the real-time applications at a very high priority, again, there is no control or guarantee that other work in the system will receive sufficient resources to execute.

Thus, a need exists for a technique that delivers real-time data streams smoothly and uninterrupted, while providing a desired amount of the processor resource for other work to be concurrently executed on the system. A further need exists for a management technique that allows a limit to be placed on the amount of resource allocated to real-time data streams, such that a selected amount of the resource remains available for non-real-time work.

SUMMARY OF THE INVENTION

The shortcomings of the prior art are overcome and additional advantages are provided through the provision of a method for managing processor resources in a computer system. An amount of a processor resource is allocated to a real-time application of the computer system. The amount is not to exceed a limit chosen for a group of one or more real-time applications, in which the group includes at least the real-time application. A selected amount of the processor resource remains available for at least one non-real-time application of the computer system.

In another embodiment of the present invention, the processing of the real-time application includes preventing the real-time application from exceeding a maximum amount of the processor resource selected for the group of real-time applications.

In another aspect of the present invention, a method of managing processor resources in a computer system is provided. An amount of a processor resource allocatable to a group of one or more real-time applications is selected, and a chosen amount of the processor resource is reserved for one or more non-real-time applications.

In another embodiment of the present invention, at least a portion of the amount of the processor resource is allocated to a real-time application, and the real-time application is processed. The real-time application is prevented from exceeding a maximum amount of the processor resource selected for the group of real-time applications.

In another aspect of the present invention, an article of manufacture including a computer useable medium having computer readable program code means embodied therein for causing the managing of processor resources in a computer system is provided. The computer readable program code means in the article of manufacture includes computer readable program code means for causing a computer to effect allocating an amount of a processor resource to a real-time application of the computer system. The amount is not to exceed a limit chosen for a group of one or more real-time applications, which includes at least the real-time application. A selected amount of the processor resource remains available for at least one non-real-time application of the computer system. Additionally, the article of manufacture includes computer readable program code means for causing a computer to effect processing the real-time application in the computer system.

In yet a further aspect of the invention, an article of manufacture including a computer useable medium having computer readable program code means embodied therein for causing the managing of processor resources in a computer system is provided. The computer readable program code means in the article of manufacture includes computer readable program code means for causing a computer to effect selecting an amount of a processor resource allocatable to a group of one or more real-time applications of the computer system; and computer readable program code means for causing a computer to effect reserving a chosen amount of the processor resource for one or more non-real-time applications of the computer system.

The management capability of the present invention advantageously enables the selection of a particular amount of a processor resource to be utilized by real-time applications, while preserving a chosen amount of the resource for non-real-time applications. Additionally, the management capability of the invention prevents the real-time applications from overrunning the computer system. Real-time applications can run smoothly and uninterrupted, while other types of work can also be processed on the system.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims

BEST MODE FOR CARRYING OUT THE INVENTION

In accordance with the principles of the present invention, real-time applications, as well as other types of applications, such as, batch and transaction processing applications, can concurrently execute on a general purpose computer system (i.e., a non-dedicated system). In particular, the real-time applications are provided with a limited amount of processor resources, such that the real-time applications do not overrun the system. The other types of applications (i.e., the non-real-time applications) are also provided a certain amount of processor resources for processing. As used herein, non-real-time applications include any applications not run in real-time, such as, for instance, batch applications and transaction processing applications, as well as any other work that runs on the system in non-real-time.

Figure 1:
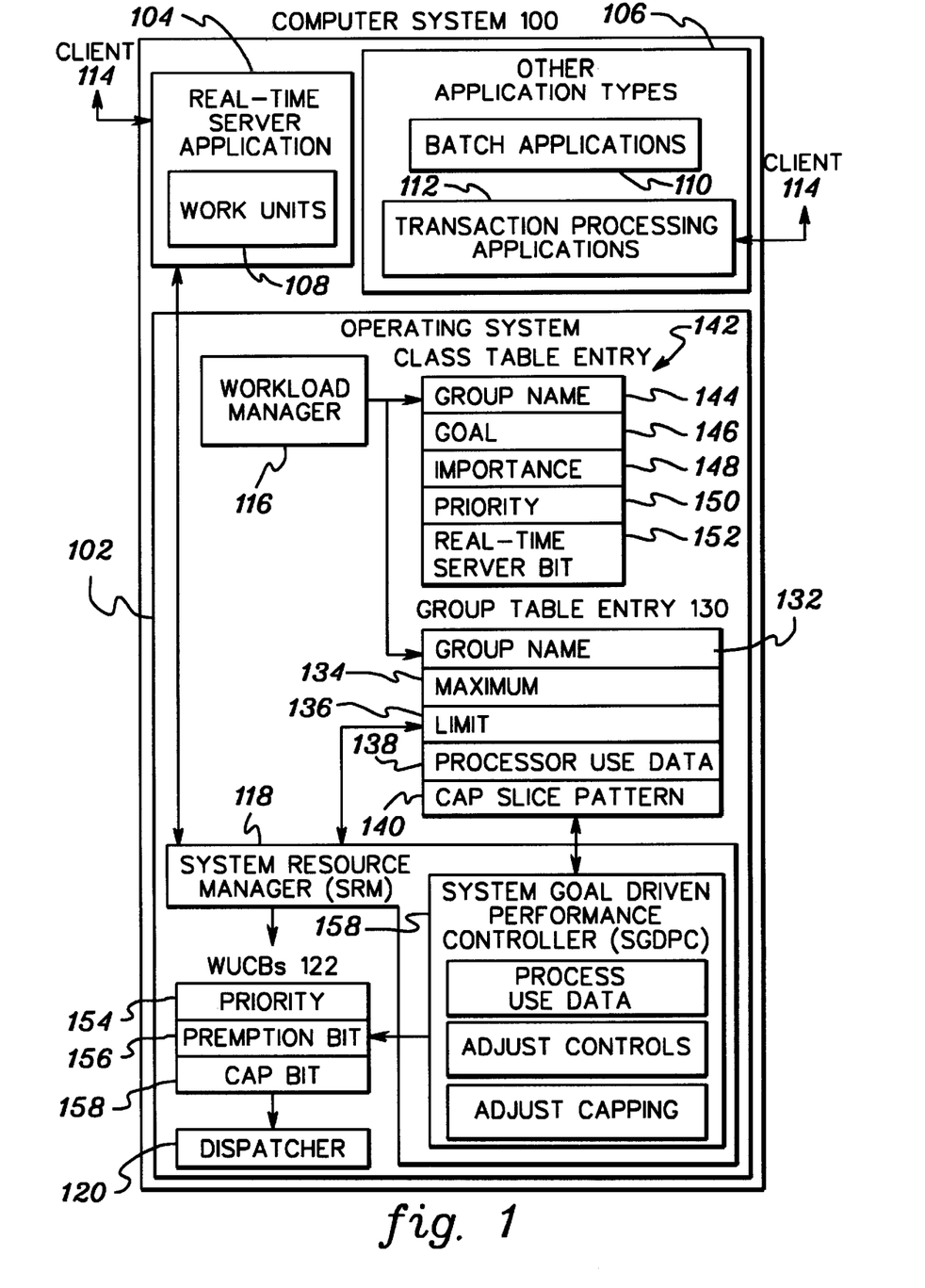
FIG. 1 depicts one example of a computer system incorporating and using the management capabilities of the present invention.

One example of a non-dedicated computer system incorporating and using the capabilities of the present invention is depicted in FIG. 1 and described in detail below.

In one embodiment, a computer system 100 includes an operating system 102, at least one real-time server application 104, and one or more other types of applications 106. Real-time server application 104 delivers real-time data and includes one or more work units 108. The work units are, for example, the application programs that do the useful work that is the purpose of the computer system. The other types of applications 106 include, for instance, batch applications 110 and transaction processing applications 112, which also include work units. The real-time server applications and the transaction processing applications are serving clients 114 at, for instance, workstations coupled to computer system 100.

Operating system 102 is, in one example, the Multiple Virtual Storage (MVS) operating system offered by International Business Machines Corporation. This is only one example, however. Other operating systems may be used without departing from the spirit or scope of the present invention. In one embodiment, operating system 102 includes a workload manager 116, a system resource manager 118, a dispatcher 120 and one or more work unit control blocks 122, each of which is described in further detail below.

Workload manager 116 manages the workload of computer system 100. One task of the workload manager includes reading in as input to the computer system certain values used by the management capability of the present invention. For example, the workload manager reads in one or more processor consumption limit values and one or more processor consumption maximum values, which are used to determine the amount of resources to be allocated to real-time applications (i.e., applications delivering real-time data) and non-real-time applications. In one example, these values are established by a system administrator.

Each processor consumption limit value specifies the amount of processor resources that can be allocated to, for instance, one or more real-time applications. This number is chosen such that other types of applications and work on the system can concurrently execute. As described further below, different real-time applications can be associated with different limit values or they can have the same limit value. Similarly, processor consumption limits can be associated with non-real-time applications.

Each processor consumption maximum value specifies a cap on the amount of processor resources that can be used by, for instance, one or more real-time applications or by one or more non-real-time applications. In one embodiment, these values are greater than the limit values, since, as is known, during processing, there may be a temporary surge in the delivery of a data stream causing the amount of allocated resources to be exceeded. Thus, each maximum value provides a buffer in case one or more processing applications needs a little more processor consumption than specified by the processor consumption limit value. The amount of resources consumed by the application(s) cannot exceed this cap. This guarantees that the additional work on the system is provided with a selected amount of processor resources. As described below, different applications can be associated with different maximum values or they can have the same maximum value.

In one embodiment, the processor consumption limit and maximum values are expressed in terms of processor service units. This is only one example, however. Those skilled in the relevant art will recognize that other units of measurement may be chosen without departing from the spirit or scope of the present invention.

Subsequent to reading in the limit and maximum values, the workload manager takes each processor consumption limit and maximum pair and establishes a resource group to which individual work units of applications are assigned. This allows different limits and maximums to be specified for different applications. For example, real-time Applications A and B may be assigned to Resource Group 1 and have a limit of 500 and a maximum of 550; while, real-time Application C is assigned to Resource Group 2 with a limit of 200 and a maximum of 210. Similarly, non-real-time Applications D and E are assigned to Resource Group 3 with a limit of 2500 and no maximum. In the above examples, real-time and non-real-time applications are in separate groups. This is only one example. In other embodiments, a group may include varying types of applications. The limits and maximums are chosen for a particular group; thus, the group, as a whole, cannot exceed these values.

Each resource group is represented in the memory allocated to the operating system by a resource group table entry 130. In one embodiment, resource group table entry 130 includes:

(a) A resource group name 132, which is an input value to the workload manager indicating the name of the resource group corresponding to this resource group entry;

(b) A processor consumption maximum value 134, which as described above, is an input value specifying a cap on the amount of processor resources allowed to be consumed by the one or more applications of this resource group;

(c) A processor consumption limit value 136, which as described above, is an input value specifying how much processor resources can be allocated to the one or more applications of this group;

(d) Processor use data 138, which includes various measured and computed data to be explained in further detail below; and (e) A cap slice pattern 140, which are computed values indicating the specific time slices when one or more work units in the resource group should be capped, as described in further detail below.

In addition to the above, workload manager 116 reads in as input performance goals of computer system 100, including their relative importance, and establishes a user performance goal class to which individual work units (of, for instance, a resource group) are assigned. Performance goals are associated with both real-time and non-real-time applications. A goal class may or may not be associated with a resource group. Work units that are not a part of a resource group can still be a part of a goal class. Additionally, more than one class may be assigned to a resource group.

Performance goals and user performance goal classes are described in detail in "Apparatus and Method for Managing A Data Processing System Workload According to Two or More Distinct Processing Goal Types," by J. D. Aman et al., U.S. Pat. No. 5,473,773, Issued on Dec. 05, 1995; and "Multi-System Resource Capping" by C. K. Eilert et al., Ser. No. 08/383,042, (Docket No. KI9-94-028), filed on Feb. 03, 1995, both of which are assigned to the same assignee as this application and both of which are hereby incorporated herein by reference in their entirety.

Each user performance goal class is represented in the memory allocated to the operating system by a class table entry 142. Class table entry 142 includes, for instance:

(a) A resource group name 144, which is an input value specifying the resource group to which the user performance goal class belongs, assuming there is a resource group. If there is no resource group, this field is left blank;

(b) A user performance goal 146, which is an input value indicating the particular performance goal of the class. One example of a performance goal includes a desired response time;

(c) A relative importance of the user performance goal 148, which is also an input value specifying the importance of this particular goal to the computer system;

(d) A dispatching priority 150, which is set by controller 158, indicates the order in which the work units of this class (as a whole) are to be dispatched relative to other classes of the system; and (e) A real-time server bit 152, which indicates whether the work units in this class are a part of a real-time serving application. This bit is set, in accordance with the principles of the present invention, as described below.

In addition to the workload manager, operating system 102 includes system resource manager 118. The system resource manager is the component of the operating system that manages the resources (e.g., CPU utilization) of the computer system. In one embodiment, system resource manager 118 includes a system goal driven performance controller (SGDPC) 158, which provides a feedback loop for the incremental detection and correction of performance problems so as to make the operating system adaptive and self-tuning, as described in further detail below.

Embodiments of a system goal driven performance controller are described in detail in "Apparatus and Method for Managing A Data Processing System Workload According To Two or More Distinct Processing Goal Types," by J. D. Aman et al., U.S. Pat. No. 5,473,773, Issued on Dec. 05, 1996; "Multi-System Resource Capping" by C. K. Eilert et al., Ser. No. 08/383,042 (Docket No. KI9-94-028), filed on Feb. 03, 1995; and in "Apparatus and Method for Managing a Distributed Data Processing System Workload According To A Plurality of Distinct Processing Goal Types" by C. K. Eilert and P. Yocom, Ser. No. 08/383,168 (Docket No. KI9-94-018), filed on Feb. 03, 1995, all of which are assigned to the same assignee of the present invention, and each of which is hereby incorporated herein by reference in its entirety.

Further details of controller 158 that are particularly relevant to the present invention are described in detail herein. In accordance with the principles of the present invention, controller 158 is responsible for processing the processor use data of the present invention; calculating performance indexes and adjusting system resource controls to manage the achievement of user performance goals; and adjusting the capping of processor resource consumption to ensure that real-time applications do not overrun the system, each of which is described in detail further below.

Operating system 102 further includes dispatcher 120, which is used to select the work unit to be executed next by computer system 100. Each work unit is represented by one of the work unit control blocks 122. Each work unit control block, which is stored in memory allocated to operating system 102, includes, for instance, the following three dispatch control fields:

(a) A dispatch priority field 154, which indicates to dispatcher 120 the order in which the dispatcher should look to dispatch work. One example of dispatch priority order is depicted in FIG. 2.

Figure 2:
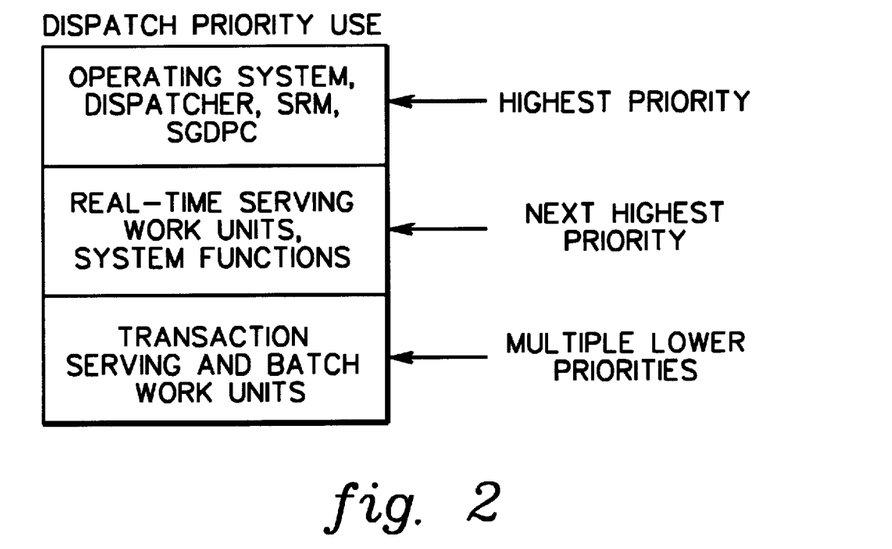
FIG. 2 depicts one example of dispatching priorities used in accordance with the principles of the present invention.

As shown in FIG. 2, in one embodiment, the highest dispatch priority is reserved for the operating system, the dispatcher, the system resource manager and the system goal driven performance controller, while the next highest priority is used for the work units of the real-time applications and for system functions.

The multiple lower priorities are reserved for work units of transaction serving and batch applications. The multiple lower priorities are assigned by operation of the system goal driven performance controller, as described in detail in the aforementioned patent and patent applications, each of which have been incorporated herein by reference in its entirety.

(b) A preemption bit field 156, which indicates to the dispatcher that the associated work unit should be considered for dispatch, as soon as it becomes ready.

(c) A cap bit field 158, which indicates to the dispatcher whether the associated unit of work may be dispatched. This bit is used to control the amount of processor execution time allowed for a particular group of work units, as described in further detail herein.

In accordance with the principles of the present invention, various components of computer system 100 are used to provide a selected amount of a processor resource (e.g., CPU time) to real-time applications and a selected amount to other types of work on the system. One embodiment of the logic associated with processing a real-time application, in accordance with the principles of the present invention, is described in detail with reference to FIG. 3.

Figure 3:
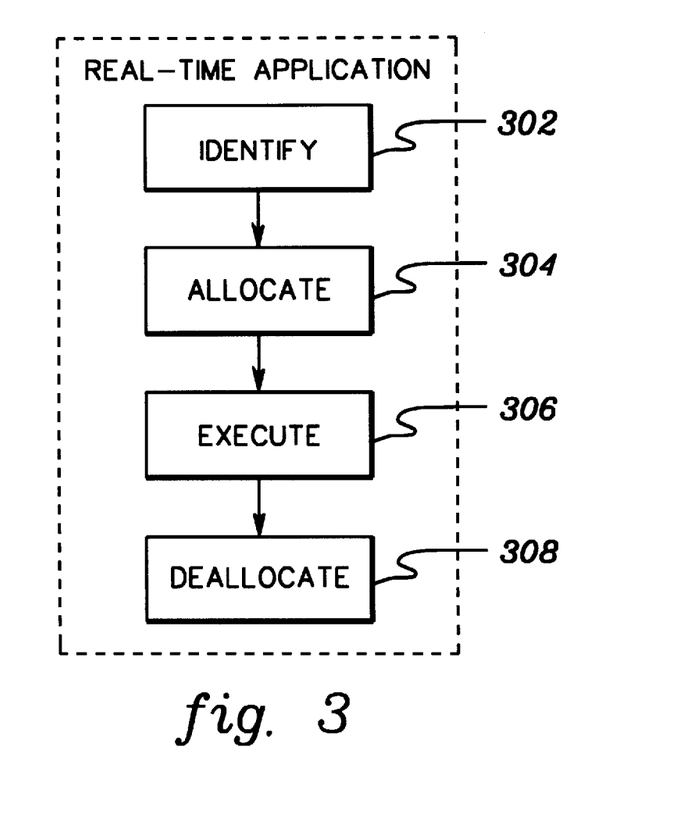
FIG. 3 depicts one embodiment of the logic used in connection with processing real-time applications, in accordance with the principles of the present invention.

Referring to FIG. 3, initially, a real-time application that wishes to execute, identifies itself to system resource manager 118, STEP 302. This allows the resource manager to make any adjustments necessary to ensure the real-time application has sufficient resources to process smoothly and uninterrupted, but does not overrun the other work on the system. One procedure for identifying an application to the system resource manager is described in detail with reference to FIG. 4. The functions described in FIG. 4 are performed, in one example, by system resource manager 118.

Figure 4:
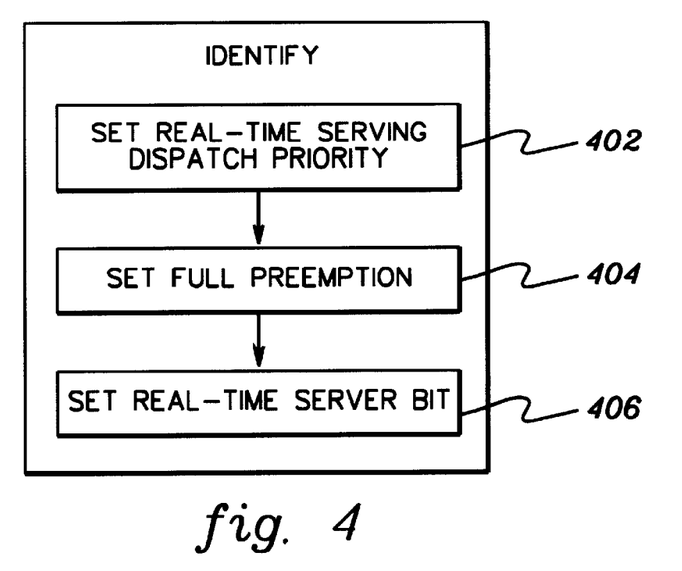
FIG. 4 depicts one example of the logic associated with the identify feature of FIG. 3, in accordance with the principles of the present invention.

Referring to FIG. 4, as one example, initially, dispatch priority 150 in class table entry 142 and priority 154 in each individual work unit control block 122 associated with the identifying real-time application, are set to the "next highest priority," which is designated for real-time applications, STEP 402.

Thereafter, each preemption bit 156 in the individual work unit control blocks 122 for the real-time application is set indicating to the dispatcher that the associated units of work should be considered for dispatch, as soon as they are available, STEP 404.

Additionally, real-time server bit 152 of class table entry 142 is set, indicating to system goal driven performance controller 158 that the work units in the class are real-time servers and the dispatch priority is not to be adjusted, STEP 406.

Subsequent to setting the dispatch priorities, the full preemption bits and the real-time server bit, the identify function is complete. Thus, returning to FIG. 3, the next task for the real-time application is to allocate resources to the application, STEP 304.

One embodiment of an allocate technique is described in detail with reference to FIGS. 5–6. The logic of FIG. 6 uses various processor use data, which are described in detail with reference to FIG. 5. After the data is described, then one embodiment of the allocate logic is described.

Figure 5:
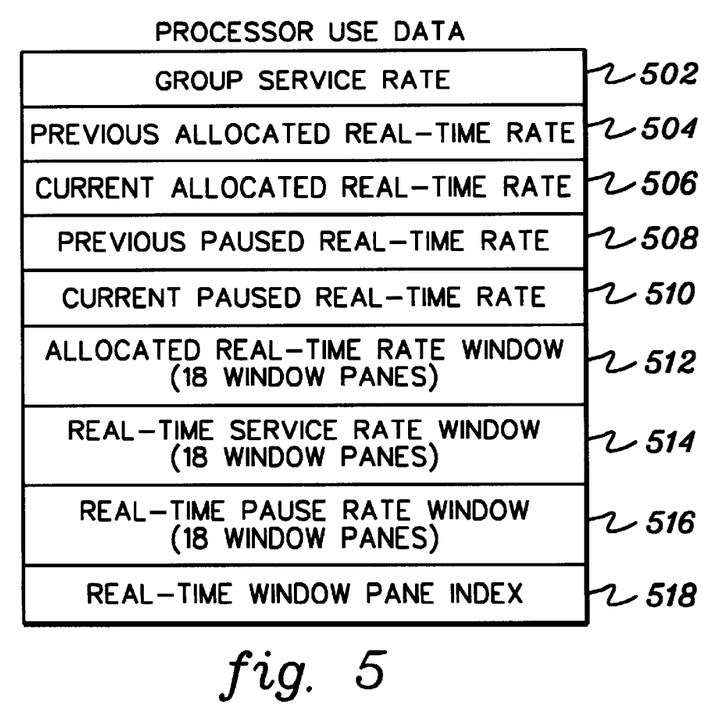
FIG. 5 depicts one example of processor use data, used in accordance with the principles of the present invention.

Referring to FIG. 5, one example of processor use data 138 of the present invention includes the following:

(a) A group service rate 502, which indicates the current service consumed (e.g., CPU consumption) by work units in the group. This rate is usually expressed in service units/second, however this is not necessary;

(b) A previous allocated real-time rate 504, which is filled in by the system goal driven performance controller when the performance controller is invoked, for instance, once every 10 seconds. The performance controller copies a current allocated real-time rate, described below, into the previous allocated real-time rate.

(c) A current allocated real-time rate 506, which represents the amount of capacity units, for example, in KB/second, currently allocated for delivery of real-time data streams of the group. The processor cost to move a byte of data from disk to the communication network is close enough to a constant to use KB/second as a unit of capacity and KB/second is a meaningful unit to real-time serving applications. A real-time serving application requests capacity in KB/second. The current allocated real-time rate is filled in by the allocate and deallocate functions, described below.

(d) A previous paused real-time rate 508, which is filled in by system goal driven performance controller 158, when controller 158 is invoked, for instance, once every ten seconds. Controller 158 copies the current paused real-time rate, described below, into the previous paused real-time rate field.

(e) A current paused real-time rate 510 includes a summation of the data rates for any paused real-time data streams of the group, as described in further detail below.

(f) An allocated real-time rate window 512 is a window of data, which includes, for example, eighteen (18) window panes. In particular, the allocated real-time rate is kept over a moving window of time. The moving window of time is defined, for example, as the most recent three minutes. The 180 second window is divided into eighteen intervals of ten seconds each, referred to as eighteen window panes, and implemented as an eighteen element array. The allocated real-time rate window panes are filled in by controller 158 when controller 158 is invoked once every ten seconds, if there was real-time serving activity during the previous ten second interval. The allocated real-time window pane is calculated by taking the average of the previous and current allocated real-time rates.

(g) A real-time service rate window 514 is another window of data that includes, for instance, eighteen (18) window panes. The real-time service rate represents the processor service consumed by the real-time application work units that deliver the real-time data stream. The real-time service rate window panes are filled in by controller 158 when it is invoked once every ten seconds, if there was real-time serving activity during the previous ten second interval. The real-time service rate window pane value is copied from the group service rate field.

(h) A real-time pause rate window 516 is a third window of data, which also includes eighteen (18) window panes, as one example. The real-time pause rate is the data rate that represents real-time data streams of this group that are currently paused. Like the other two data windows, the pause rate window panes are filled in by controller 158 when it is invoked once every ten seconds, if there was real-time serving activity during the previous ten second interval. The paused real-time rate window pane value is calculated by taking the average of the previous and current paused real-time rates.

(i) A real-time window pane index 518 represents the current index for the window pane array elements. Data for the current ten second interval is stored in the window pane array element indexed by the current window pane index. The eighteen array elements of each window array are used in rotation. After the eighteenth element is used, data for the next time interval is stored in the first element, replacing the old data in that element. The real-time window pane index is advanced by controller 158, if there was real-time serving activity during the previous ten second interval. When there is no real-time serving activity, the index is not advanced. This preserves earlier service cost per KB/second data for use when real-time serving is again started.

As mentioned earlier, the above-described processor use data is used during the allocate function of the present invention. In general, the allocate function of the system resource manager is invoked by the real-time server to allocate and guarantee processor capacity for delivery of a real-time data stream. The input value of the allocate function is the KB/second data rate for the real-time stream. During allocate, the real-time data window panes are scanned to find the maximum processor service cost per KB/second transferred over the eighteen panes in the window. Then, this value is used to determine the service requirements for the new stream. Thereafter, a check is made to determine if the required processor capacity is available within group service limit 136 specified by the system administrator. Further details of one embodiment of the allocate function is described with reference to FIG. 6.

Figure 6:
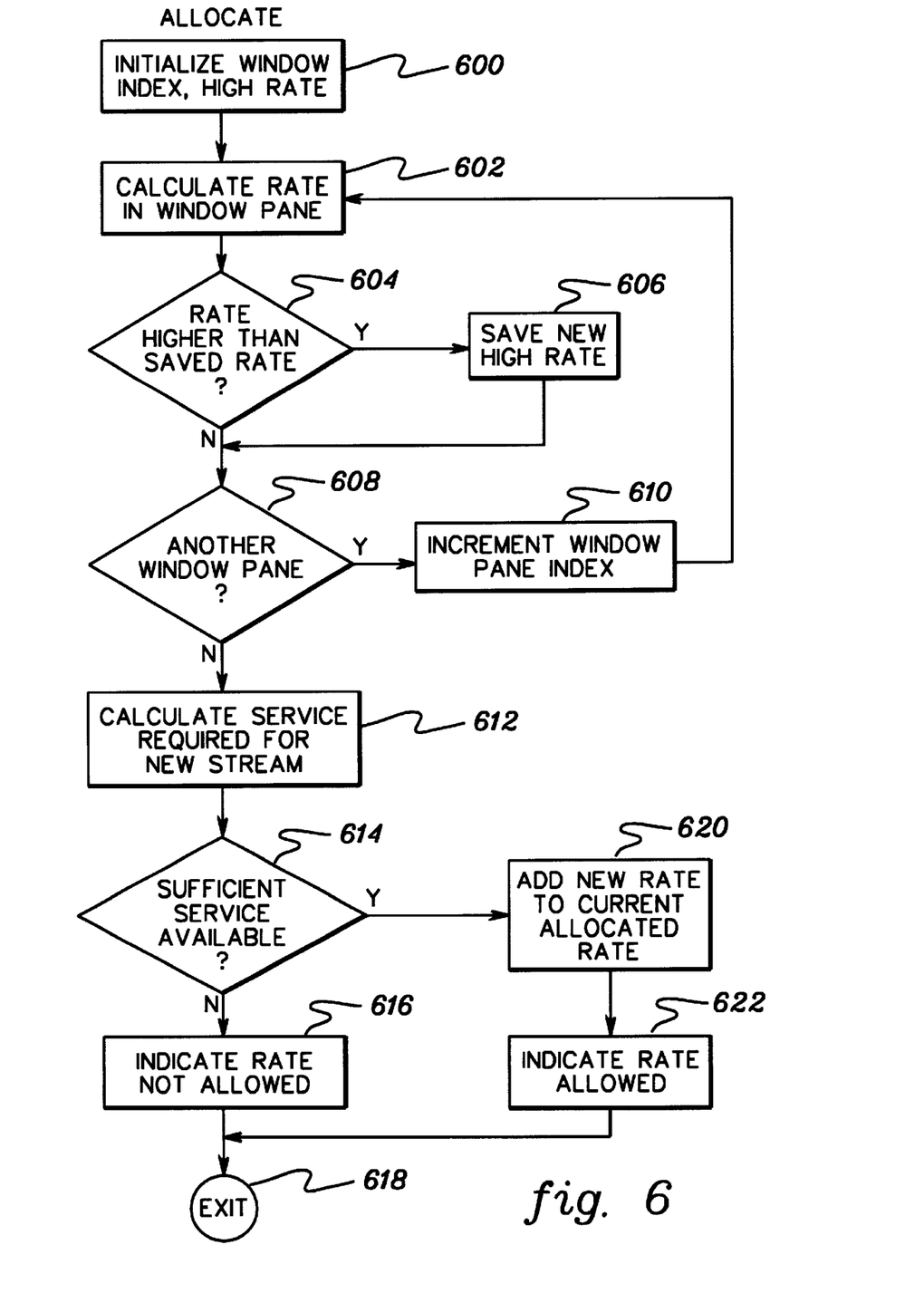
FIG. 6 depicts one embodiment of the logic used to allocate processor resources to a real-time application, in accordance with the principles of the present invention.

Referring to FIG. 6, initially, window pane-index 518 is set to point to the first window pane for the window pane scan, and a variable, referred to as high rate, is initialized to zero, STEP 600. Thereafter, the service cost of delivering a KB/second (data rate) is calculated as follows:

Real-Time Service Rate Window 514÷(Allocated Real-Time Rate Window 512–Real Time Pause Rate Window 516), STEP 602.

The value calculated at STEP 602 is the current service rate, which is also referred to as the new rate. The new rate is checked against the saved high rate, INQUIRY 604. If the new rate saved in allocated real-time rate window pane 512 is higher than the high rate, the high rate is set to the new rate, STEP 606. After saving the new high rate, or if the current service rate is less than or equal to the high rate, a further inquiry is made to determine if there is another window pane, INQUIRY 608. In particular, the window pane index is compared to 18 and if it is less than 18, then, in this particular case, real-time window pane index 518 is incremented by one, STEP 610. Control then flows to STEP 602 "Calculate Rate in Window Pane."

If, however, there are no other window panes to be scanned, the service required to deliver a new real-time data stream is calculated, as follows:

KB For New Stream×Highest Service Rate Per KB In Window, in which the KB for the new stream is an input value and the highest service rate is that rate stored in the high rate variable.

After the amount of needed service is calculated, a determination is made as to whether that amount of service is available within group service limit 136, INQUIRY 614. If sufficient capacity is not available, an unsuccessful return code is set, STEP 616, and the allocate function is complete, STEP 618.

If, however, there is sufficient capacity to deliver the real-time data stream, then the rate for the new stream is added to current allocated real-time rate 506, STEP 620, and a successful return code is set, STEP 622. Thereafter, the allocate function is complete, STEP 618.

Returning to FIG. 3, after the allocate function is performed, then the real-time serving application can be executed thereby delivering a real-time data stream, STEP 306.

During execution of the real-time serving applications, as well as non-real-time applications, system goal driven performance controller 158 monitors system resource utilization and adjusts certain controls based on the monitoring.

As one example, the performance controller performs two tasks including, for instance, adjusting system resource controls, such as dispatching priority, in order to manage the achievement of the user performance goals, STEP 700 (FIG. 7); and adjusting the capping of certain resource groups to limit resource consumption by those groups, STEP 702. Each of the tasks is described in further detail herein.

Figure 7:
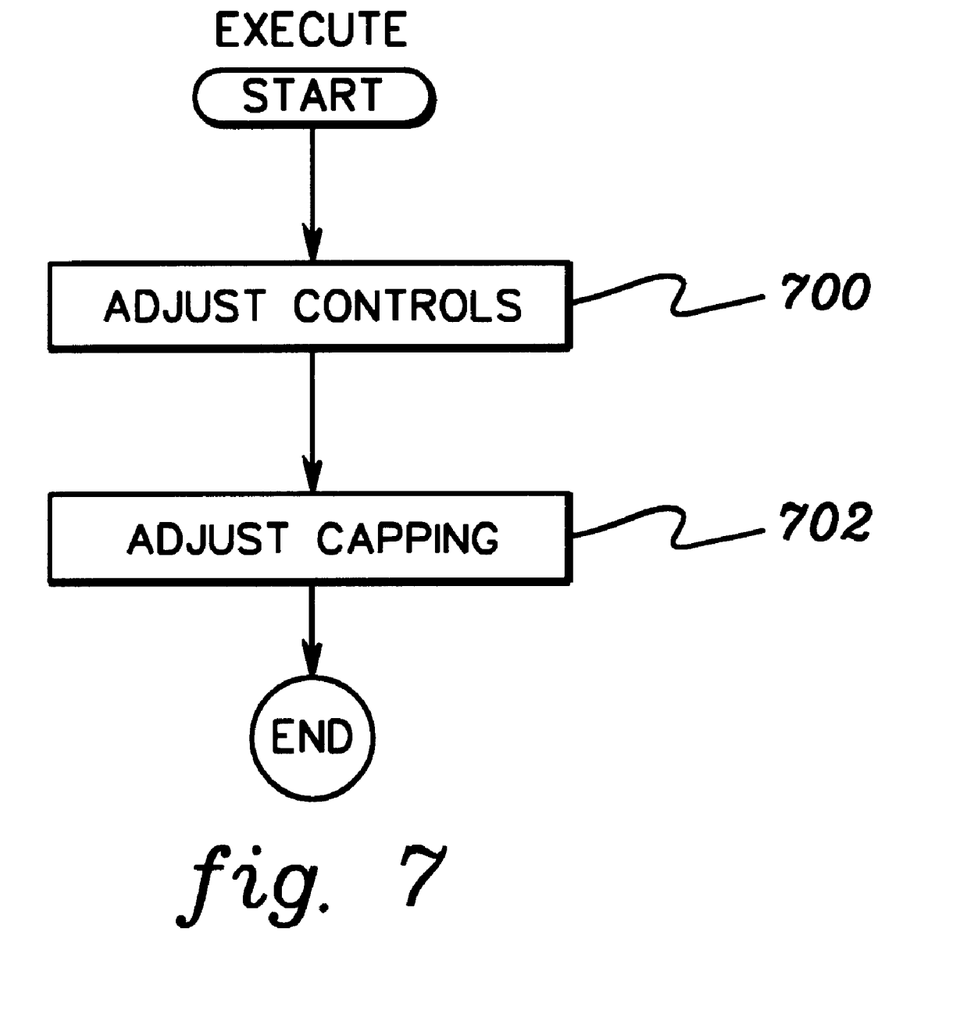
FIG. 7 depicts one embodiment of the logic used during execution of the real-time application, in accordance with the principles of the present invention.

The first task, adjust system resource controls (STEP 700), is performed at certain intervals during the execution of applications on the system, as one example. In one embodiment, controller 158 is invoked every 10 seconds to determine if the system controls need to be adjusted.

In particular, the adjust controls function of controller 158 measures the achievement of the performance goals, selects the user performance goal classes that need their performance improved, and improves the performance of the selected user performance goal classes by modifying the system control parameters (i.e., the controlled variables including, for instance, dispatching priority) of the associated work units. However, before modifying certain parameters, such as dispatching priority, performance controller 158, in accordance with the principles of the present invention, checks real-time server bit 152 to determine if the application is a real-time server application. If the bit is on, indicating the delivery of a real-time data stream, the dispatch priority for the class (priority 150), as well as the dispatch priority in each applicable work unit (priority 154), remains unchanged. This ensures that the real-time data stream is guaranteed a certain amount of resources.

When the real-time server bit is off, then the dispatching priority can be adjusted. Processing of controller 158 for non-real-time applications is described in detail in "Multi-System Resource Capping" by C. K. Eilert et al., Ser. No. 08/383,042 (Docket No. KI9-94-028), filed on Feb. 03, 1995, which is hereby incorporated by reference in its entirety. However, in accordance with the principles of the present invention, the processor capacity available to the non-real-time serving work units is the total processor capacity minus the processor capacity guaranteed to and used by the real-time serving work units.

The second task, adjust capping (STEP 702), also operates similarly to that described in the aforementioned "Multi-System Resource Capping". The adjust capping function determines the amount of time that work units assigned to each resource group should be made non-dispatchable (capped) to limit resource consumption to the maximum value specified for that resource group in resource group maximum 134.

In particular, a length of time (the length is dependent on processor speed), is divided into a number of intervals, such as, for instance 64 intervals, and the adjust capping function calculates the number of intervals work units in each resource group are to be capped. It then sets an indicator corresponding to each of the 64 intervals indicating whether the resource group should be capped during that interval. These indicators form cap slice pattern 140. The cap bits are spread relatively evenly over the 64 intervals, as described in "Multi-System Resource Capping."

A cap bit manipulator function of the system resource manager is invoked during each of the 64 intervals to check the cap bit patterns to determine which resource groups should be capped and sets the cap bits accordingly in the work unit control blocks for the work units. The cap bits are interrogated by dispatcher 120 to determine if a unit of work may be dispatched. In the present invention, a system administrator specifies a maximum value for the real-time serving resource groups and the capping function guarantees that the real-time serving applications consume no more than the specified maximum processor capacity.

Figure 8:
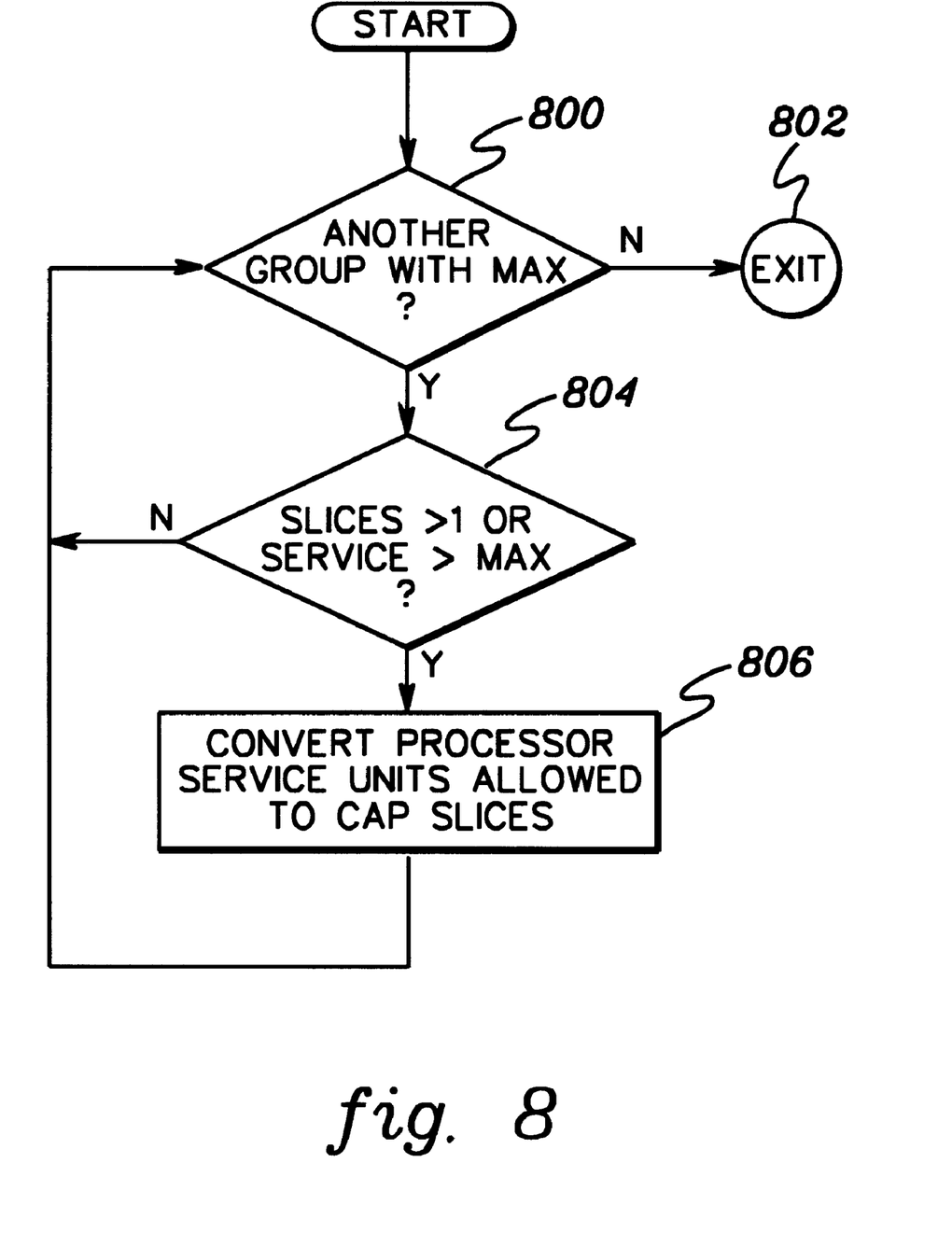
FIGS. 8–9 depict one example of the logic used during a capping function of the execute procedure of FIG. 7, in accordance with the principles of the present invention.
Figure 9:
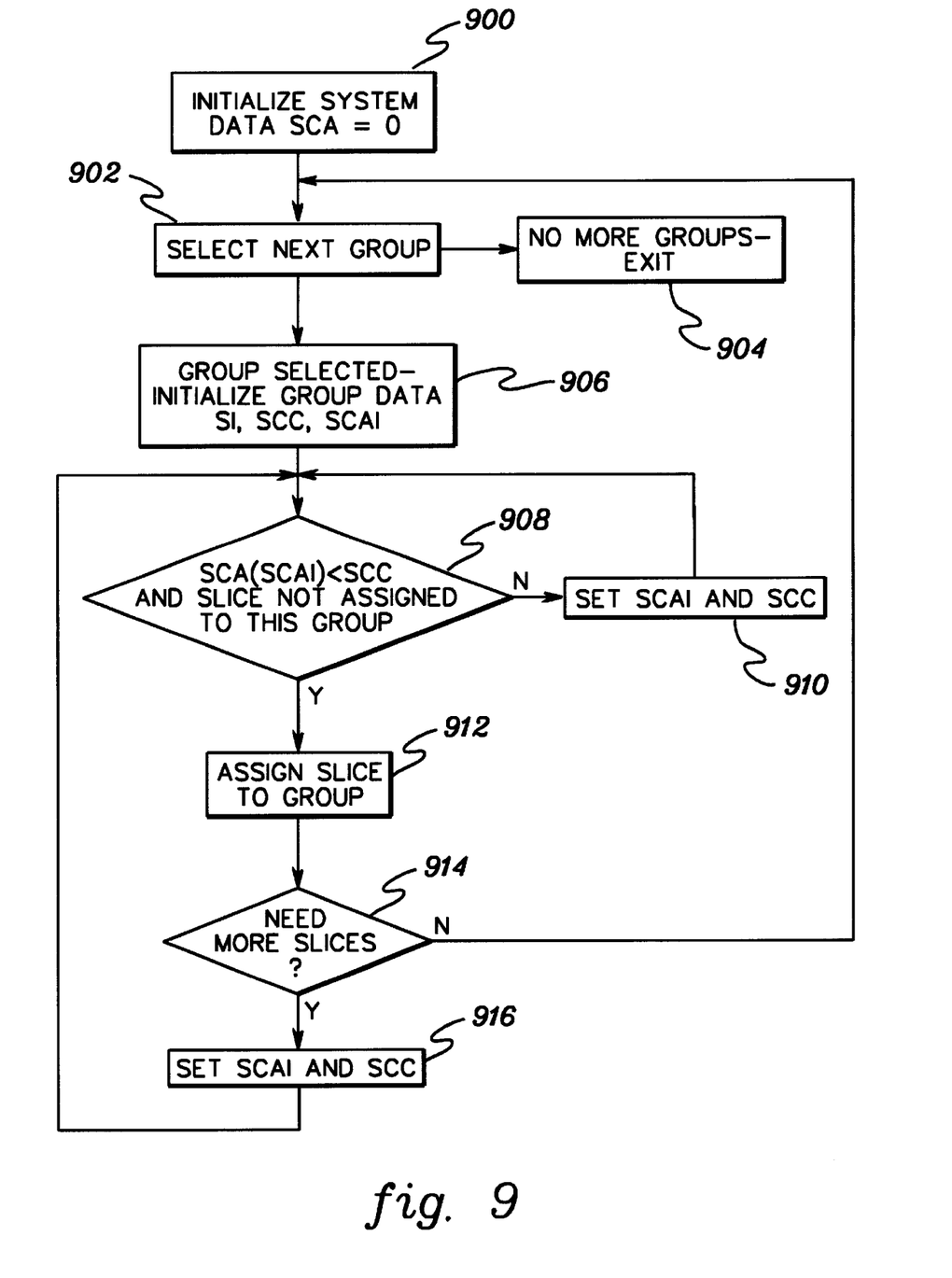

One embodiment of the capping function is described in detail with reference to FIGS. 8–9. Referring to FIG. 8, initially, a check is made to determine whether there is another resource group with a maximum value and thus, needs to be processed, INQUIRY 800. If there are no other groups to be processed, then the function is complete and control flows to STEP 802.

However, if there is another resource group to process, a check is made to determine whether the resource group either has cap slices set currently or is currently consuming more processor time than the specified maximum, STEP 804. If the result of this check is negative, control flows to STEP 800 to process the next resource group.

On the other hand, if cap slices are currently set or a resource group has exceeded its maximum, then control flows to STEP 806 to calculate the cap slices for the resource group.

At STEP 806, the number of processor service units allowed (i.e., maximum 134) is converted to a number of cap slices using the following steps:

1. Calculate the number of non-cap slices allowed as follows:

Non-Cap-Slices=SA*(TSLOW-CSLOW)/SEROW

Where:
    SA—processor service units allowed (i.e., the maximum);
    TSLOW—total number of slices over window (e.g., 6*64=384, a constant);
    CSLOW—number of capped slices over a cap slice window, described below; and
    SEROW—processor service units consumed over a service window, described below.
    Cap slice window is, for example, a 6 pane window of, for instance, 10 seconds each. Each window pane contains the number of capped slices for that pane. Service window is also, for example, a 6 pane window, in which each pane contains the service measured over 10 seconds. Cap slice window and service window are indexed by a capping index starting at 1, incrementing by 1 and returning back to 1 after reaching 6. Cap slice window, service window and capping index are a part of processor use data 138 (however, they are not shown in FIG. 5).

2. If non-cap-slices calculates to 0, set it to 1. Do not cap 100% of the time.

3. Set cap slices equal to total slices (64) minus non-cap slices.

4. If the increase in cap slices is more than half the total number of slices, increase the number of cap slices by half the total number of slices.

5. Store the number of cap slices in the resource group table entry 140. The number of cap slices is stored in the cap slice array element indexed by the current window pane index.

In addition to determining the number of cap slices to be capped, the cap slices for each resource group are spread relatively evenly over the cap slice pattern for the cap bit manipulator to interrogate. The resource group having the largest number of capped slices is assigned specific slices first, then the resource group needing the next largest number of cap slices, and then the next, until all resource groups having capped slices have been processed. On a system-wide basis, the same number of resource groups ±1 group are capped during each of the 64 slices in the cap slice pattern by keeping a count of the number of resource groups that are to be capped during each slice as specific slices are assigned to specific resource groups. This count is tested to determine whether the group should be assigned a specific slice. No slice is assigned to two resource groups until all 64 slices have been assigned once. No slice is assigned to three groups until all 64 slices have been assigned twice, and so on.

One embodiment for spreading the cap slices is described in detail with reference to FIG. 9. Initially, system data, cap slice count array (SCA), is initialized by setting the array elements to zero, STEP 900. The slice count array is an array of counts. Each entry contains the number of groups that are capped during that slice. There are 64 entries in the cap slice count array. Each entry represents 1/64th of the time.

Thereafter, the resource group with the largest number of cap slices that has not already been processed is selected, STEP 902. If there are no more resource groups to process, control flows to exit, STEP 904. If there is another resource group to process, control flows to STEP 906.

At STEP 906, resource group data is initialized. In particular, a slice increment (SI), a slice count criteria (SCC), and a slice count array index (SCAI) are initialized, as follows: (SI-1) is the number of slices that can be skipped between each cap slice for the resource group, such that the resource group's cap slices are spread relatively evenly over the 64 possible cap slices. SI is set to 64 divided by the group's number of cap slices. SCC is set to the maximum value in the slice count array. If all the counts in the slice count array have the same value, 1 is added to SCC. The SCAI is set to 1 to start at the first slice in the cap slice pattern.

Next, the count in the SCA(SCAI) cell is checked against the criteria (SCC) for this group, INQUIRY 908. If the slice has been assigned to SCC number of groups or has already been assigned to this group, control flows to STEP 910, where 1 is added to SCAI. When SCAI is incremented to 65, it is reset back to 1 (that is, SCAI is modulo 64). If all the counts in the slice count array have the same value, 1 is added to SCC. Control then flows back to STEP 908.

If the slice has been assigned to less than SCC number of resource groups and has not been assigned to the current group being processed, control flows to STEP 912, where the slice is assigned to the group and 1 is added to the use count for the slice in the SCA. The slice is assigned to the resource group by setting the bit corresponding to SCAI in the resource group's cap slice pattern 140. Control then flows to INQUIRY 914.

At INQUIRY 914, a check is made to determine whether another slice is to be assigned to the current resource group. If specific slices have been assigned for all the group's cap slices, control flows back to STEP 902 to check for another resource group. If, however, the group needs another specific slice assigned, control flows to STEP 916.

At STEP 916, SI is added to SCAI to set the next specific slice to check. If SCAI is greater than 64, 64 is subtracted from SCAI. If all the counts in the SCA have the same value, 1 is added to SCC. Then control flows back to STEP 908. Thereafter, the spreading of the cap slices is complete.

Once again returning to the overview diagram of FIG. 3, after the identify, allocate and execute functions are complete, the processor resources allocated to deliver the real-time data stream are deallocated using a deallocate function, STEP 308. In particular, the real-time server invokes the system resource manager's deallocate function to indicate a real-time data stream has ended and will no longer consume the allocated processor resources.

Figure 10:
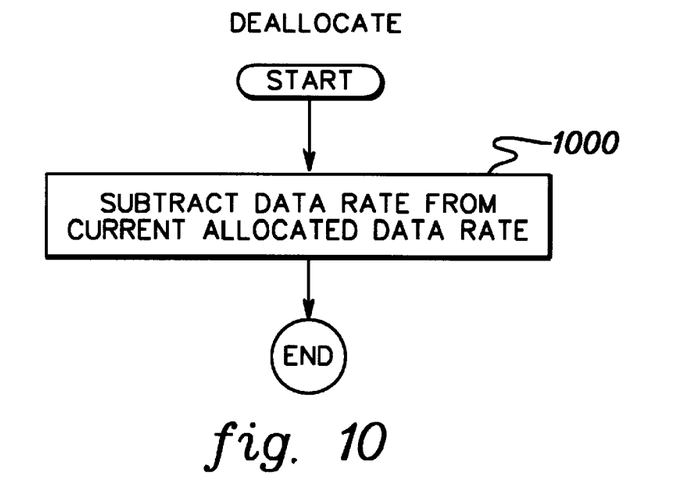
FIG. 10 depicts one embodiment of the logic used during deallocation of the resources allocated to the real-time application, in accordance with the principles of the present invention.

One embodiment of the deallocate function is described with reference to FIG. 10. In one example, in order to deallocate the processor resources, the input data rate is subtracted from current allocated real-time rate 506, STEP 1000. Thus, the current rate indicates those resources are available for delivering additional data streams. Thereafter, deallocate is complete.

In accordance with the principles of the present invention, during delivery of a real-time data stream, the client may decide to pause the viewing. In such a case, the real-time server invokes the system resource manager's pause function to indicate that the client viewing the real-time data stream has paused viewing, for instance, the video. Paused streams do not contribute to processor consumption, but the processor time that they require is still reserved. Thus, the data rate for paused streams is used in the calculations. One embodiment of the pause function is described in detail with reference to FIG. 11. Additionally, a resume function is described as well.

Figure 11:
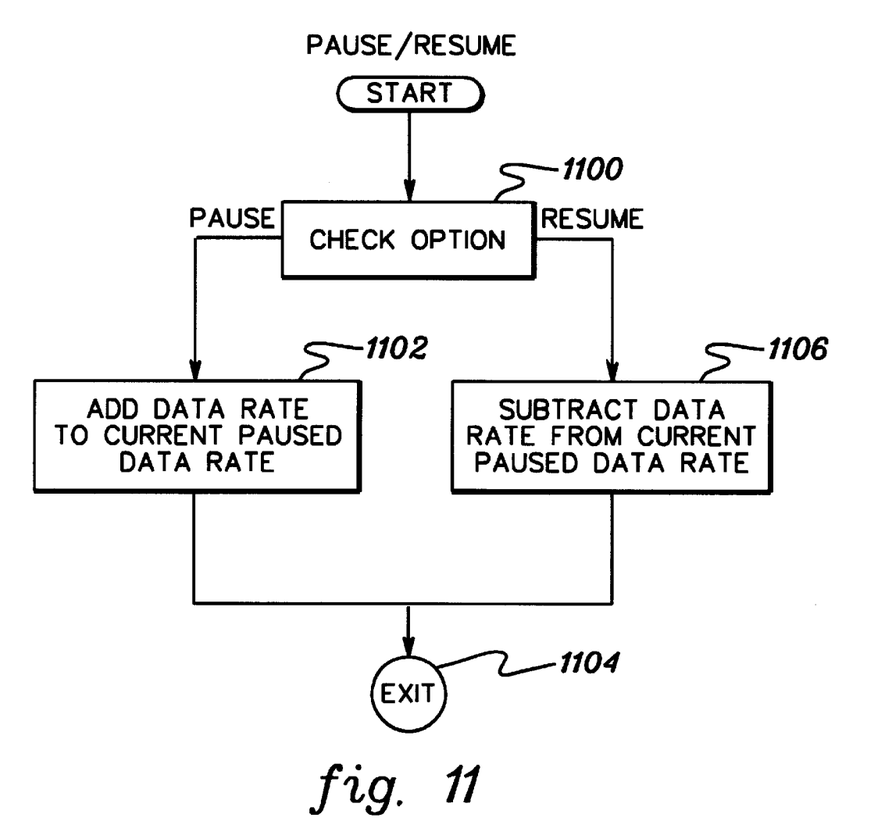
FIG. 11 depicts one embodiment of the logic used during a pause/resume of the execution of the real-time application, in accordance with the principles of the present invention.

Referring to FIG. 11, initially, a check is made to determine whether the client is pausing the delivery of a real-time data stream or resuming delivery after a pause, INQUIRY 1100. If the option is pause, then the input data rate is added to current paused real-time rate 510, STEP 1102. Thereafter, the pause function of the present invention is complete, STEP 1104.

If, on the other hand, the option is resume, then the input data rate is subtracted from the current paused data rate, STEP 1106, and the resume function is complete, STEP 1104.

Described above is a processor resource management capability that provides a selected amount of resources to real-time servers, while also ensuring a selected amount of resources are reserved for processing other types of applications and additional work on the system.

The computer system described above is only one example. Other systems or environments can incorporate and/or use the present invention without departing from the spirit of the present invention.

The present invention can be included in an article of manufacture (e.g., one or more computer program products) having, for instance, computer useable media. The media has embodied therein, for instance, computer readable program code means for providing and facilitating the capabilities of the present invention. The article of manufacture can be included as a part of a computer system or sold separately.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of managing processor resources in a general purpose computer system, comprising:

allocating an amount of a processor resource to a real-time application of said general purpose computer system, said amount not to exceed a limit chosen for a group of one or more real-time applications, said group including at least said real-time application, wherein a selected amount of said processor resource remains available for at least one non-real-time application of said general purpose computer system, and wherein said processor resource comprises processing capacity of one or more central processing units; and processing said real-time application, wherein said processing comprises preventing, by a resource manager without assistance from said real-time application, said real-time application from exceeding a maximum amount of said processor resource selected for said group of real-time applications.

2. The method of claim 1, further comprising indicating to said computer system that said real-time application wishes to be processed.

3. The method of claim 2, wherein said indicating comprises:

setting a dispatch priority chosen for said real-time application; and specifying said dispatch priority is not to be adjusted.

4. The method of claim 1, wherein said allocating comprises:

determining a highest service cost, within a given period of time, for delivering a real-time data rate;

calculating a service rate for delivering a real-time data stream of said real-time application; and indicating a sufficient amount of said processor resource is available for said real-time data stream when said service rate falls within said limit.

5. The method of claim 4, further comprising adding a data rate of said real-time data stream to a current allocated data rate in order to track the amount of processor resource currently allocated to said group of real-time applications.

6. The method of claim 1, further comprising deallocating said allocated amount of said processor resource when said real-time application no longer needs said processor resource.

7. The method of claim 6, wherein said deallocating comprises subtracting a data rate of said real-time application from a current allocated data rate such that the deallocated amount of processor resource is now available for said group of real-time applications.

8. The method of claim 1, further comprising pausing processing of said real-time application.

9. The method of claim 8, wherein said pausing comprises reserving said allocated amount of processor resource.

10. The method of claim 8, further comprising resuming processing of said paused real-time application.

11. The method of claim 1, wherein said processing of said real-time application comprises adjusting one or more control parameters associated with said real-time application, when said one or more control parameters need adjusting to meet one or more performance goals of said computer system.

12. The method of claim 1, further comprising processing one of said at least one non-real-time application, wherein said processing of said one non-real-time application comprises adjusting one or more control parameters associated with said one non-real-time application, when said one or more control parameters need adjusting to meet one or more performance goals of said computer system.

13. The method of claim 1, wherein said preventing comprises indicating one or more work units of said real-time application is non-dispatchable such that said maximum amount is not exceeded.

14. A method of managing processor resources in a computer system, comprising:
   selecting an amount of a processor resource allocatable to a group of one or more real-time applications of said computer system, said processor resource comprising processing capacity of one or more central processing units;
   reserving a chosen amount of said processor resource for one or more non-real-time applications of said computer system; and
   preventing, by a resource manager without assistance of said one or more real-time applications, said group of one or more real-time applications from exceeding a maximum amount of said processor resource selected for said group of one or more real-time applications.

15. The method of claim 14, wherein said selecting comprises selecting an amount of said processor resource allocatable to a plurality of groups of one or more real-time applications.

16. An article of manufacture comprising:
   a computer useable medium having computer readable program code means embodied therein for causing the managing of processor resources in a general purpose computer system, the computer readable program code means in said article of manufacture comprising:
      computer readable program code means for causing a computer to effect allocating an amount of a processor resource to a real-time application of said general purpose computer system, said amount not to exceed a limit chosen for a group of one or more real-time applications, said group including at least said real-time application, wherein a selected amount of said processor resource remains available for at least one non-real-time application of said general purpose computer system, and wherein said processor resource comprises processing capacity of one or more central processing units; and
      computer readable program code means for causing a computer to effect processing said real-time application, wherein said computer readable program code means for causing a computer to effect processing comprises computer readable program code means for causing a computer to effect preventing, by a resource manager without assistance from said real-time application, said real-time application from exceeding a maximum amount of said processor resource selected for said group of real-time applications.

17. The article of manufacture of claim 16, further comprising computer readable program code means for causing a computer to effect indicating to said computer system that said real-time application wishes to be processed.

18. The article of manufacture of claim 17, wherein said computer readable program code means for causing a computer to effect indicating comprises:
   computer readable program code means for causing a computer to effect setting a dispatch priority chosen for said real-time application; and
   computer readable program code means for causing a computer to effect specifying said dispatch priority is not to be adjusted.

19. The article of manufacture of claim 16, wherein said computer readable program code means for causing a computer to effect allocating comprises:
   computer readable program code means for causing a computer to effect determining a highest service cost, within a given period of time, for delivering a real-time data rate;
   computer readable program code means for causing a computer to effect calculating a service rate for delivering a real-time data stream of said real-time application; and
   computer readable program code means for causing a computer to effect indicating a sufficient amount of said processor resource is available for said real-time data stream when said service rate falls within said limit.

20. The article of manufacture of claim 19, further comprising computer readable program code means for causing a computer to effect adding a data rate of said real-time data stream to a current allocated data rate in order to track the amount of processor resource currently allocated to said group of real-time applications.

21. The article of manufacture of claim 16, further comprising computer readable program code means for causing a computer to effect deallocating said allocated amount of said processor resource when said real-time application no longer needs said processor resource.

22. The article of manufacture of claim 21, wherein said computer readable program code means for causing a computer to effect deallocating further comprises computer readable program code means for causing a computer to effect subtracting a data rate of said real-time application from a current allocated data rate such that the deallocated amount of processor resource is now available for said group of real-time applications.

23. The article of manufacture of claim 16, further comprising computer readable program code means for causing a computer to effect pausing processing of said real-time application.

24. The article of manufacture of claim 23, wherein said computer readable program code means for causing a computer to effect pausing comprises computer readable program code means for causing a computer to effect reserving said allocated amount of processor resource.

25. The article of manufacture of claim 23, further comprising computer readable program code means for causing a computer to effect resuming processing of said paused real-time application.

26. The article of manufacture of claim 16, wherein said computer readable program code means for causing a computer to effect processing of said real-time application comprises computer readable program code means for causing a computer to effect adjusting one or more control parameters associated with said real-time application, when said one or more control parameters need adjusting to meet one or more performance goals of said computer system.

27. The article of manufacture of claim 16, further comprising computer readable program code means for causing a computer to effect processing one of said at least one non-real-time application, wherein said processing of said one non-real-time application comprises adjusting one or more control parameters associated with said one non-real-time application, when said one or more control parameters need adjusting to meet one or more performance goals of said computer system.

28. The article of manufacture of claim 16, wherein said computer readable program code means for causing a computer to effect preventing comprises computer readable program code means for causing a computer to effect indicating one or more work units of said real-time application is non-dispatchable such that said maximum amount is not exceeded.

29. An article of manufacture comprising:
   a computer useable medium having computer readable program code means embodied therein for causing the managing of processor resources in a computer system, the computer readable program code means in said article of manufacture comprising:
      computer readable program code means for causing a computer to effect selecting an amount of a processor resource allocatable to a group of one or more real-time applications of said computer system, said processor resource comprising processing capacity of one or more central processing units;
      computer readable program code means for causing a computer to effect reserving a chosen amount of said processor resource for one or more non-real-time applications of said computer system; and
      computer readable program code means for causing a computer to effect preventing, by a resource manager without assistance of said one or more real-time applications, said group of one or more real-time applications from exceeding a maximum amount of said processor resource selected for said group of one or more real-time applications.

30. The article of manufacture of claim 29, wherein said computer readable program code means for causing a computer to effect selecting comprises computer readable program code means for causing a computer to effect selecting an amount of said processor resource allocatable to a plurality of groups of one or more real-time applications.

31. The method of claim 1, wherein said real-time application is prevented from overrunning said computer system.

32. The method of claim 16, wherein said real-time application is prevented from overrunning said computer system.

* * * * *

UNITED STATES PATENT AND TRADEMARK OFFICE
CERTIFICATE OF CORRECTION

| | |
|---|---|
| PATENT NO. | : 6,282,560 B1 |
| DATED | : August 28, 2001 |
| INVENTOR(S) | : Eilert et al. |

Page 1 of 1

It is certified that error appears in the above-identified patent and that said Letters Patent is hereby corrected as shown below:

<u>Column 1,</u>
Line 20, delete "08/829,538" and insert -- 08/826,028 --

Signed and Sealed this

Twelfth Day of March, 2002

Attest:

*Attesting Officer*

JAMES E. ROGAN
*Director of the United States Patent and Trademark Office*